(12) United States Patent
Kholodnyak et al.

(10) Patent No.: US 8,958,050 B2
(45) Date of Patent: Feb. 17, 2015

(54) TUNABLE TERAHERTZ METAMATERIAL FILTER

(71) Applicant: Samsung Electronics Co., Ltd., Suwon-si (KR)

(72) Inventors: Dmitry Viktorovich Kholodnyak, St. Petersburg (RU); Dmitry Sergeevich Kozlov, St. Petersburg (RU); Irina Borisovna Vendik, St. Petersburg (RU); Mikhail Aleksandrovich Odit, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 13/678,826

(22) Filed: Nov. 16, 2012

(65) Prior Publication Data

US 2013/0128132 A1   May 23, 2013

(30) Foreign Application Priority Data

Nov. 17, 2011 (RU) .................................. 2011146615
May 22, 2012 (KR) ........................ 10-2012-0054449

(51) Int. Cl.
*G02F 1/13* (2006.01)
*H01P 1/20* (2006.01)

(52) U.S. Cl.
CPC ................ *G02F 1/1313* (2013.01); *H01P 1/20* (2013.01)
USPC .............................................. 349/193; 349/1

(58) Field of Classification Search
None
See application file for complete search history.

(56) References Cited

U.S. PATENT DOCUMENTS

| 6,933,812 B2 | 8/2005 | Sarabandi et al. |
| 8,013,693 B2 | 9/2011 | Schenkel et al. |
| 2004/0000971 A1 | 1/2004 | Killen et al. |

FOREIGN PATENT DOCUMENTS

JP    2007-322738 A    12/2007

*Primary Examiner* — Richard Kim
(74) *Attorney, Agent, or Firm* — Sughrue Mion, PLLC

(57) ABSTRACT

A tunable terahertz (THz) metamaterial (MTM) filter including: a first wire grid and a second wire grid that are arranged parallel to each other; a dielectric substrate and a liquid crystal layer that are sequentially disposed between the first wire grid and the second wire grid; a plurality of metal strips that are disposed between the dielectric substrate and the liquid crystal layer; and a first control electrode electrically connected to the first wire grid and a second control electrode electrically connected to the second wire grid.

14 Claims, 4 Drawing Sheets

TUNABLE TERAHERTZ METAMATERIAL FILTER

CROSS-REFERENCE TO RELATED APPLICATIONS

This application claims priority from Korean Patent Application No. 10-2012-0054449, filed on May 22, 2012 in the Korean Intellectual Property Office, and Russian Patent Application No. 2011-146615, filed on Nov. 17, 2011 in the Russian Patent Office, the disclosures of which are incorporated herein in their entirety by reference.

BACKGROUND

1. Field

Apparatuses consistent with exemplary embodiments relate to radio frequency (RF) technology, and more particularly, to filtering devices for terahertz electromagnetic radiation.

2. Description of the Related Art

Terahertz (THz) radiation is an area of research having numerous applications in short-range high speed communication, security, medicine, various industries, space research and the like.

Recently, progress has been demonstrated in producing compact THz sources and detectors, but still, there is a shortage of devices for controlling THz radiation (switchers, modulators, phase shifters, etc,). Basically, this is caused by 'THz gap' phenomena. Natural materials are transparent to THz radiation and do not exhibit a strong magnetic or electric response within the range of 1 to 3 THz. To enable proper interaction in the THz range, it is necessary to create artificial materials with specified properties.

Among novel materials, artificial electromagnetic materials—metamaterials (MTMs) play an important role. MTMs enable desired electromagnetic properties in any frequency range. MTMs solve the problem of 'THz gap' phenomena and stimulate terahertz research and development. Electromagnetic MTMs have exhibited exotic properties, such as negative or zero dielectric and magnetic permittivity, negative or zero refractive index, and effects of super resolution and cloaking. MTMs are expected to a niche for THz manipulating devices, which is not possible by using natural materials.

The design of various MTMs with specified properties has been widely discussed. Structures such as MTMs based on split-ring resonators, MTMs based on resonant dielectric inclusions, ferroelectrics- and ferromagnetics-based MTMs, MTMs based on phase change materials, layered metal-dielectric structures of MTMs, and MTM structures including liquid crystals are most often used for the realization of MTMs in a microwave field in a range of millimeter waves and in a THz frequency range. The above-listed structures are often used in creating tunable MTMs.

Such devices based on MTMs may perform the role of a zero order resonator for the mobile terminal of a wireless energy transmitter. Such a structure is described, for example, in US patent application No. 2010/0123530. The devices in this patent reference possess properties of an MTM (zero dielectric and magnetic permittivity). An example of a band-pass THz filter is described in U.S. Pat. No. 7,483,088, in which the device is in the form of a frequency selector with frequency-tuning properties, based on a phase delay that is provided by using liquid crystals. A Lyot-filter, described in U.S. Pat. No. 7,483,088, represents a dual refractive filter, widely applicable in visible and infra-red (IR) radiation bands. The filter functions are based on principles of interference of polarized light by a combination of the dual refractive index devices, whose optical axes are inclined with respect to each other. Lyot-filters can be used in active phase-slowing-down dual refractive index devices such as electro-optical crystals and nematic liquid crystals.

However, the above-described structures require a large magnetic field to control a resonant frequency and magnets of a large size. Also, frequency tuning of the filter requires mechanical deflection of the position of the magnets, which is far slower than optical or electronic control. Furthermore, the level of insertion loss of the filter is relatively high (8 dB). In addition, the structure of the device is extremely complex to manufacture.

U.S. Pat. No. 7,826,504 discloses a device consisting of a plurality of metal (gold) electrical resonance elements (MTMs), allocated on a semiconducting substrate. The MTM elements represent resonators in the form of conductive frames with isolated gaps, or have a dual structure in the form of non-conductive circuits with conductive gaps. Both such structures provide control of a transfer constant of a structure. Various shapes of resonance elements are disclosed and compared. Schottky diodes, in which a saturation range or depletion of a charge is formed in a gap area, are built in a set of resonance elements. Modulation of charging density provides 50% modulation of a level of transparency of a structure in a THz range that is 10 times better than that of many existing devices. The disclosed device allows the modulation of radiation in a THz range that can be used in, for example, a quantum cascade laser.

However, the device disclosed in U.S. Pat. No. 7,826,504 has low efficiency with respect to its capacity as a band-pass filter. Selectivity of the disclosed device (used as the band-pass filter) is extremely small. The slope of fronts of the transfer constant is small, and thus, the effective filtering of waves of a specified length is not provided. Additionally, tuning the device according to frequency has negligible effect. Most of these types of resonators used in such structures are anisotropic. Such structures can be effectively used only for a specific type of polarization of waves radiated in a THz range.

SUMMARY

One or more exemplary embodiments provide tunable terahertz (THz) metamaterial (MTM) filters including wire grids in which nematic liquid crystals are embedded.

Additional exemplary aspects will be set forth in part in the description which follows and, in part, will be apparent from the description, or may be learned by practice of the presented embodiments.

According to an aspect of an exemplary embodiment, a tunable THz MTM filter includes: a first wire grid and a second wire grid that are arranged parallel to each other; a dielectric substrate and a liquid crystal layer that are sequentially disposed between the first wire grid and the second wire grid; a plurality of metal strips that are disposed between the dielectric substrate and the liquid crystal layer; and a first control electrode and a second control electrode, where each of the first control electrode and the second control electrode are electrically connected to the first wire grid and the second wire grid.

Each of the first wire grid and the second wire grid may include a plurality of tetragonal boundaries, and a number of the plurality of the metal strips is equal to a number of the plurality of tetragonal boundaries in each of the first wire grid and the second wire grid, such that one of the plurality of metal strips corresponds to each pair of tetragonal boundaries comprising one of the tetragonal boundaries of the first wire grid and one of the tetragonal boundaries of the second wire grid.

A vertical distance between the first wire grid and the second wire grid may be substantially the same as a period of the plurality of tetragonal boundaries of each of the first wire grid and the second wire grid.

The vertical distance may be within the range of 10 to 100 μm.

Each of the plurality of metal strips has a cross-shape comprising one strip parallel to a first side of the plurality of tetragonal boundaries of each of the first wire grid and the second wire grid and one strip parallel to a second side of the plurality of tetragonal boundaries of each of the first wire grid and the second wire grid.

The first control electrode and the second control electrode may be disposed on opposite sides of the THz MTM filter.

The metal strips may be spaced apart from the first control electrode and the second control electrode.

An operating frequency of the filter may be controlled by a vertical distance between the first wire grid and the second wire grid and cross-sections of the first wire grid and the second wire grid.

The operating frequency of the filter may be modulated by applying a voltage between the first and second control electrodes.

The operating frequency may be in a range of 0.2 to 3 THz.

The applied voltage may allow permittivity of the liquid crystal layer to exceed 1.

The applied voltage may allow permittivity of the liquid crystal layer to vary in a range from 1 to 3.

The applied voltage may allow permittivity of the liquid crystal layer to vary in a range from 2 to 3.

According to an aspect of another exemplary embodiment, a tunable THz MTM filter includes a plurality of the tunable THz MTM filters described above that are stacked on one another.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
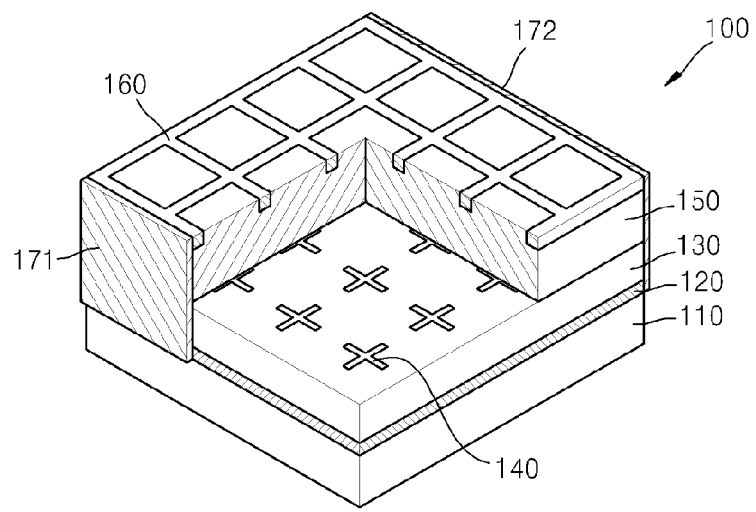
FIG. 1 is a cutaway perspective view of a tunable terahertz (THz) metamaterial (MTM) filter according to an exemplary embodiment.

Reference will now be made in detail to exemplary embodiments, which are illustrated in the accompanying drawings, wherein like reference numerals refer to like elements throughout. In this regard, exemplary present embodiments may have different forms and should not be construed as being limited to the descriptions set forth herein. Hereinafter, it will also be understood that when an element such as layer, region, or substrate is referred to as being "on" another element, it can be directly on the other element, or intervening elements may also be present.

Figure 2:
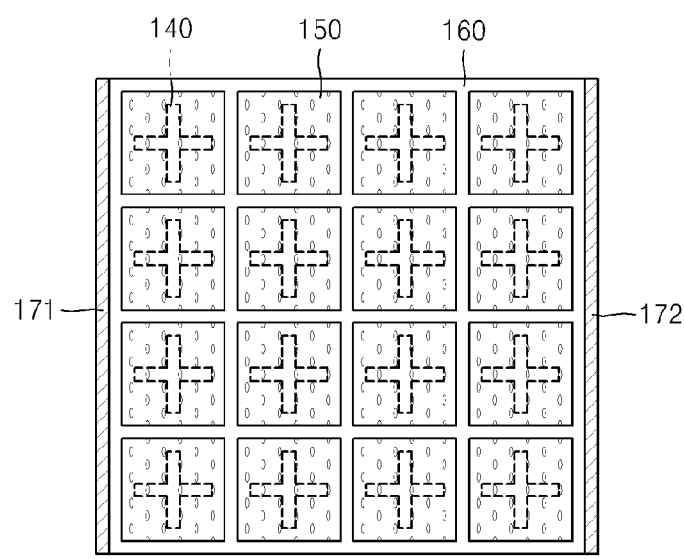
FIG. 2 is a plan view of the tunable THz MTM filter of FIG. 1.

FIG. 1 is a cutaway perspective view schematically showing a structure of a tunable THz MTM filter 100 according to an exemplary embodiment. FIG. 2 is a plan view of the tunable THz MTM filter of FIG. 1.

Referring to FIGS. 1 and 2, a first wire grid 120 is disposed on a first dielectric substrate 110, and a second dielectric substrate 130 covering the first wire grid 120 is disposed on the first dielectric substrate 110. A plurality of metal strips 140 are formed on the second dielectric substrate 130. A liquid crystal layer 150, covering the metal strips 140, is formed on the second dielectric substrate 130. A second wire grid 160 is disposed on the liquid crystal layer 150. A first control electrode 171 and a second control electrode 172, are each electrically connected to the first wire grid 120 and the second wire grid 160, are formed on opposite sides of the tunable THz MTM filter 100.

The first wire grid 120 and the second wire grid 160 may be formed of substantially the same material and may have the same shape. Each of the first wire grid 120 and the second wire grid 160 may include a plurality of boundaries having a tetragonal shape, for example, a square shape. The first wire grid 120 and the second wire grid 160 may be formed of copper.

Figure 3:
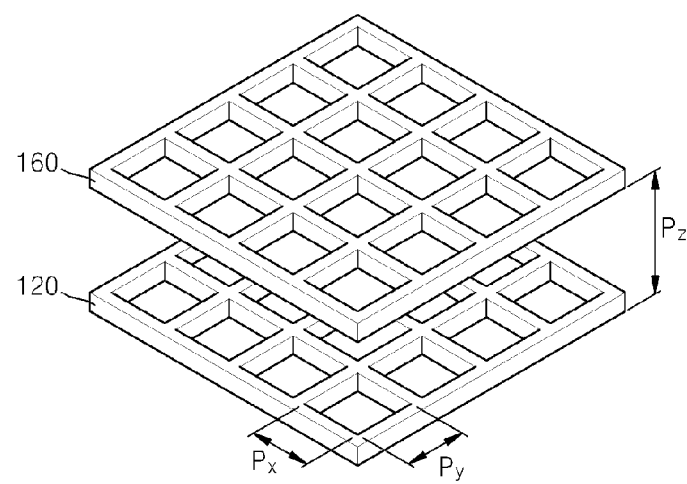
FIG. 3 is a view of an arrangement of a first wire grid and a second wire grid of FIG. 1.

FIG. 3 is a view of an arrangement of the first wire grid 120 and the second wire grid 160. A distance $p_z$ between the first wire grid 120 and the second wire grid 160 in a z-direction (spacing) and an x-direction period ($p_x$) and a y-direction period ($p_y$) of the tetragonal boundaries may be the same. The x-direction period $p_x$ and the y-direction period $p_y$ of the tetragonal boundaries are respectively the same as an x-direction length of the tetragonal boundary and a y-direction length of the tetragonal boundary. The measurements ($p_z$, $p_x$, and $p_y$) may each be about 10 micrometers (μm) to about 100 μm.

A vertical cross-section of the boundaries of the first wire grid 120 and the second wire grid 160 in FIG. 3 is rectangular but the cross sections are not limited thereto. For example, the vertical cross-section of the boundaries of the first wire grid 120 and the second wire grid 160 may be circular or may have other shapes. A size (diameter) of the vertical cross-section of the boundaries of the first wire grid 120 and the second wire grid 160 may be several μm. The boundaries of the first wire grid 120 and the second wire grid 160 may have the same shape.

The second dielectric substrate 130 may be formed of a dielectric body having a low insertion loss.

The metal strips 140 are cross-shaped. The metal strips 140 may be arranged so that one of the metal strips corresponds to each tetragonal boundary of the first wire grid 120 and the second wire grid 160 as illustrated in FIG. 2. Each of the metal strips 140 may be oriented in the same direction. As illustrated in FIG. 2, the metal strips 140 may be of a cross-shape that cross in a x-y direction (side direction of the tetragonal boundaries) in order to provide isotropy properties in the x-y direction.

The liquid crystal layer 150 fills spaces between the metal strips 140 and the second wire grid 160. The liquid crystal layer 150 may be formed of nematic liquid crystals.

The first control electrode 171 and the second control electrode 172 may each be electrically connected to the first wire grid 120 and the second wire grid 160 that are exposed on lateral sides of the tunable THz MTM filter 100.

The liquid crystal layer 150 provides tunability of the tunable THz MTM filter 100 due to a voltage applied to the first control electrode 171 and the second control electrode 172. Due to the applied voltage, liquid crystal molecules rotate, thereby changing a permittivity of the liquid crystal layer 150. Depending on a voltage applied to the first control electrode 171 and the second control electrode 172, when a refractive index varies by 0.33 or more, the permittivity $\in_{LC}$ of the liquid crystals may vary by 1 or more.

Figure 4:
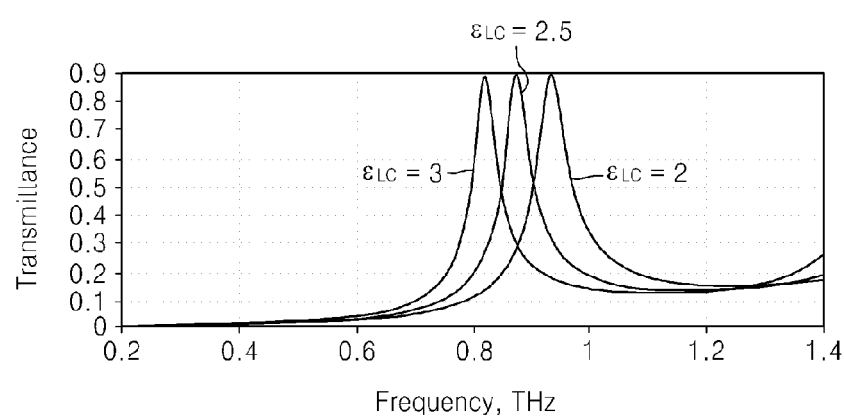
FIG. 4 is a graph showing variations in transmittance characteristics of a filter having three types of LC permittivities $\in_{LC}$ according to an exemplary embodiment.

FIG. 4 is a graph showing variations in transmittance characteristics of the tunable THz MTM filter 100 having three types of LC permittivities $\in_{LC}$ according to an exemplary embodiment.

When the LC permittivity varies from 2 to 3, a range of tunability of the filter not less than 13% is provided.

Figure 5:
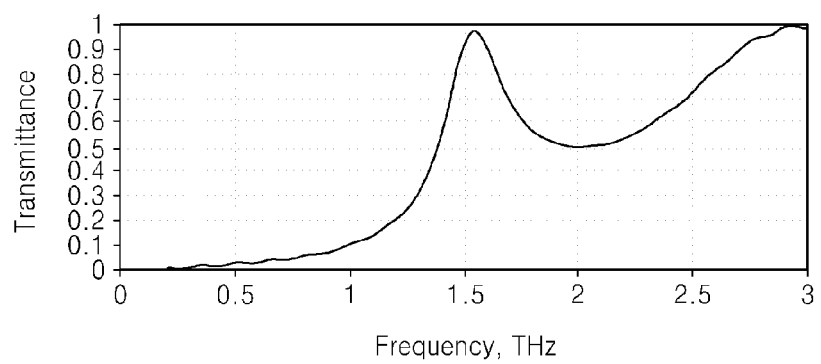
FIG. 5 is a graph showing variations in transmittance characteristics of a tunable THz MTM filter according to an exemplary embodiment.

FIG. 5 is a graph showing variations in transmittance characteristics of the tunable THz MTM filter 100 according to an exemplary embodiment.

Referring to FIG. 5, the tunable THz MTM filter 100 operates in a low THz range (0.2-3 THz).

An operating frequency of the tunable THz MTM filter 100 corresponds to a plasma frequency. A wavelength number $k_p$ of the tunable THz MTM filter 100 at the plasma frequency is defined by geometry of the tunable THz MTM filter 100 and is calculated by a formula disclosed in *A triple wire medium as an isotropic negative permittivity MTM*, by M. Hudlicka, J. Machac, I. S. Nefedov, Progress In Electromagnetics Research, Vol. 65, 233-246, 2006.

$$k_p^2 = \frac{2\pi}{p^2} \frac{1}{\ln\frac{p^2}{4r(p-r)}}, \quad (1)$$

where p denotes a vertical distance between wire grids, and r denotes a radius of wire grids. A plasma frequency is expressed by the following formula:

$$f_p = \frac{c \cdot k_p}{2\pi\sqrt{\varepsilon_h}}, \quad (2)$$

where c denotes light speed, and $\in_h$ denotes permittivity of a dielectric substrate on which wire grids are formed.

Regardless of whether the cross-section of the first wire grid 120 and the second wire grid 160 is square or round or has any other shape, it does not affect the properties of the tunable THz MTM filter 100. To obtain THz frequencies, a radius of the first wire grid 120 and the second wire grid 160 may be several μm.

In the tunable THz MTM filter 100 according to the current embodiment, in a range of plasma frequency, the wire grid has only a single resonance with respect to the transmittance characteristics (see FIG. 5). This range is a frequency range at which electromagnetic waves pass through the tunable THz MTM filter 100 without attenuation and reflection.

The tunable THz MTM filter 100 operates according to the same principle as a zero order resonator, but differs in that a unit for tuning an operating frequency of the tunable THz MTM filter 100 is mounted.

The tunable THz MTM filter 100 is independent in relation to polarization by an external electromagnetic wave. This is due to a symmetry of the tunable THz MTM filter 100. Insertion loss in the tunable THz MTM filter 100 is lower than other similar devices.

In addition, the tunable THz MTM filter 100 is operated in a THz range, and provides a reflection mode or a transmission mode on the specified frequency depending on an applied voltage.

The tunable THz MTM filter 100 has an operating frequency that is close to a plasma frequency of the first and second wire grids 120 and 160. A driving frequency of the tunable THz MTM filter 100 is tuned according to a variation in the applied voltage.

According to the range of the voltage variation, permittivity of liquid crystals may be 1 or higher, or from 1 to 3, or from 2 to 3.

Figure 6:
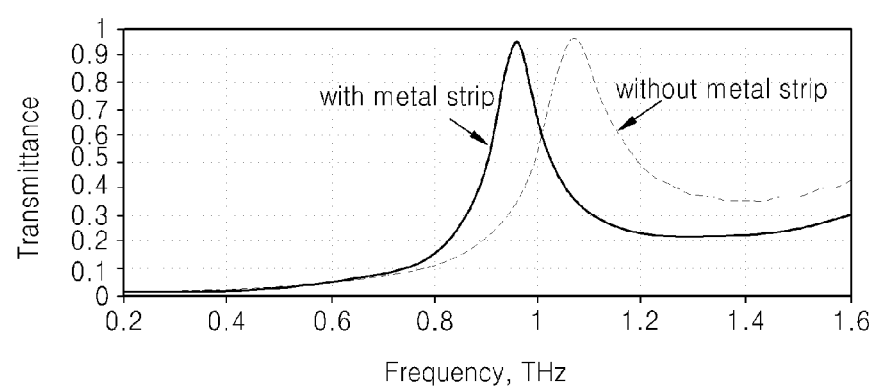
FIG. 6 is a graph showing transmittance characteristics of the tunable THz MTM filter of FIG. 1 with and without metal strips.

FIG. 6 is a graph showing transmittance characteristics of the tunable THz MTM filter 100 of FIG. 1 with and without the metal strips 140. Due to the existence of the metal strips 140, the tunable THz MTM filter 100 may be able to transmit electromagnetic waves in a narrow range near the plasma frequency.

Due to the metal strips 140, selectivity of the tunable THz MTM filter 100 may be improved. The metal strips 140 provide a high slope and a deeper filter behavior (frequency selectivity) when transmission is conducted at a frequency equal to or higher than the plasma frequency.

The tunable THz MTM filter 100 includes a plurality of wire grids with the nematic liquid crystal layer therebetween. The wire grids have artificial electric plasma having a plasma frequency in terahertz region or near-infrared region (in comparison with an optical frequency for metals where an electron gas possesses properties of plasma. At the plasma frequency of the wire grids, an effective permittivity of the tunable THz MTM filter 100 tends to be zero, and the tunable THz MTM filter 100 exhibits zero-order resonance behavior. In the tunable THz MTM filter 100, transmission of electromagnetic waves may be possible in a narrow range in the vicinity of plasma frequency.

Application of nematic liquid crystals having variable effective permittivity provides control of a plasma frequency. Permittivity of nematic crystals vary according to an applied voltage. According to an alternative exemplary embodiment, permittivity of liquid crystals is modulated not by a voltage but by changing temperature of the liquid crystals.

Figure 7:
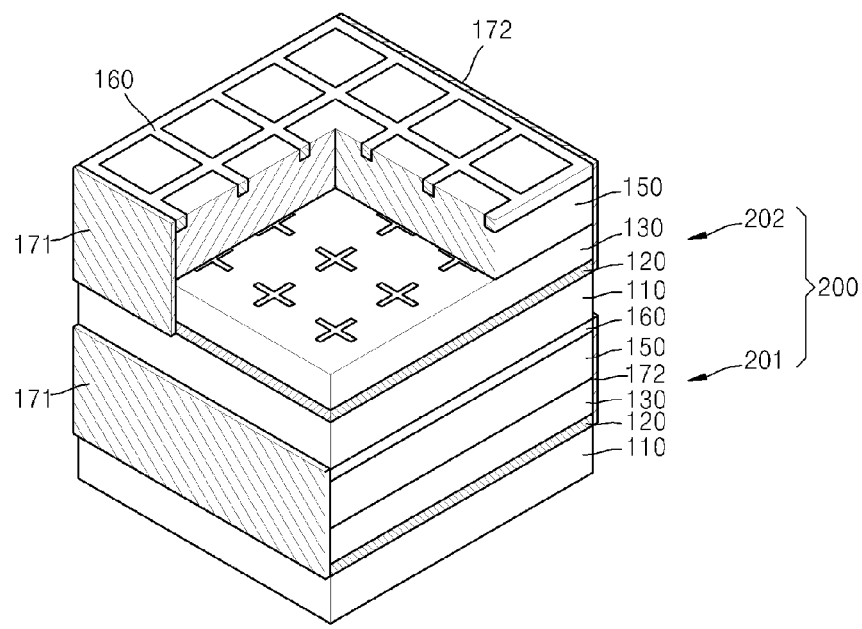
FIG. 7 is a perspective view of a tunable THz MTM filter according to another exemplary embodiment.

FIG. 7 is a perspective view of a tunable THz MTM filter 200 according to another exemplary embodiment. For convenience of illustration, some portions of the tunable THz MTM filter 200 are removed. Like elements as in FIG. 1 denote like reference numerals, and detailed descriptions thereof will be omitted here. Referring to FIG. 7, the tunable THz MTM filter 200 includes two sets of stacked filters 201 and 202. The filter 202 is stacked on the filter 201. Each of the filters 201 and 202 has substantially the same structure as that of the tunable THz MTM filter 100 described above.

Figure 8:
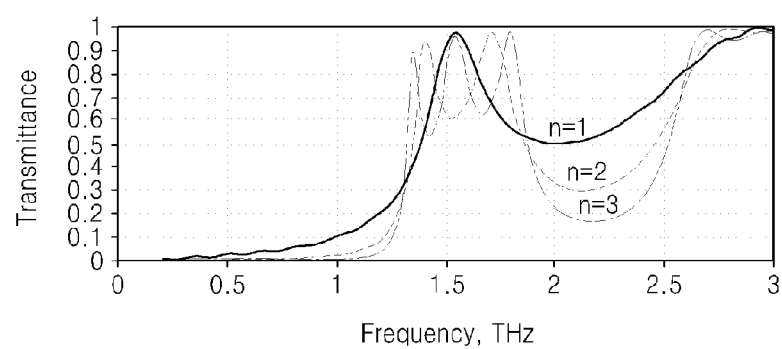
FIG. 8 is a graph showing transmittance characteristics of the tunable THz MTM filter according to the number of sets of the filters.

FIG. 8 is a graph showing transmittance characteristics of the THz MTM filter according to the number of stacked sets of filters. Referring to FIG. 8, the number of resonance peaks depends on the number (n) of sets of the filters used in the structure.

While a set of two filters 201 and 202 are stacked in FIG. 7, exemplary embodiments are not limited thereto. For example, three or more sets of filters may also be stacked.

If the number of filters increases infinitely, propagation of electromagnetic waves that is lower than the plasma frequency does not occur. Electromagnetic waves are transferred only at a plasma frequency or higher.

In the tunable THz MTM filter 100 where the number of sets of filters is small, transmission of electromagnetic waves exhibits resonance behavior at a frequency close to a plasma frequency by interacting with an adjacent layer. The number of resonance peaks is influenced by the number of sets used in the tunable THz MTM filter (see FIG. 8). Referring to FIG. 8, n denotes the number of sets of the filters. When there are two or three sets of filters, two or three resonance peaks may be present.

In the filter 200 of FIG. 7, since the operating frequency of the filters 201 and 202 is modulated by a voltage applied to each of the filters 201 and 202, the operating frequency of the filter 200 may be minutely adjusted compared to the tunable THz MTM filter 100 of FIG. 1.

A THz MTM filter according to one or more exemplary embodiments may provide a band-pass filter based on a M™ having an adjusted variable.

In addition, a tunable THz MTM filter according to one or more exemplary embodiments may provide high-frequency selectivity of THz radiation and a simple structure having a high transparency regarding radiation of a THz range.

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A tunable terahertz (THz) metamaterial (MTM) filter comprising:
    a first wire grid and a second wire grid that are arranged parallel to each other;
    a dielectric substrate and a liquid crystal layer that are sequentially disposed between the first wire grid and the second wire grid;
    a plurality of metal strips that are disposed between the dielectric substrate and the liquid crystal layer; and
    a first control electrode and a second control electrode, each of the first control electrode and the second control electrode being electrically connected to the first wire grid and the second wire grid.

2. The tunable THz MTM filter of claim 1, wherein each of the first wire grid and the second wire grid comprises a plurality of tetragonal boundaries, and a number of the plurality of the metal strips is equal to a number of the plurality of tetragonal boundaries in each of the first wire grid and the second wire grid, such that one of the plurality of metal strips corresponds to each pair of tetragonal boundaries comprising one of the tetragonal boundaries of the first wire grid and one of the tetragonal boundaries of the second wire grid.

3. The tunable THz MTM filter of claim 2, wherein a vertical distance between the first wire grid and the second wire grid is substantially the same as a period of the plurality of tetragonal boundaries of each of the first wire grid and the second wire grid.

4. The tunable THz MTM filter of claim 3, wherein the vertical distance is approximately 10 μm to 100 μm.

5. The tunable THz MTM filter of claim 3, wherein each of the plurality of metal strips has a cross-shape comprising one strip parallel to a first side of the plurality of tetragonal boundaries of each of the first wire grid and the second wire grid and one strip parallel to a second side of the plurality of tetragonal boundaries of each of the first wire grid and the second wire grid.

6. The tunable THz MTM filter of claim 1, wherein the first control electrode is disposed on a first side of the THz MTM filter and the second control electrode is disposed on a second side, opposite the first side, of the THz MTM filter.

7. The tunable THz MTM filter of claim 1, wherein the metal strips are spaced apart from the first control electrode and the second control electrode.

8. The tunable THz MTM filter of claim 1, wherein an operating frequency of the filter is controlled by a vertical distance between the first wire grid and the second wire grid and cross-sections of the first wire grid and the second wire grid.

9. The tunable THz MTM filter of claim 8, wherein the operating frequency of the filter is modulated by applying a voltage between the first control electrode and the second control electrode.

10. The tunable THz MTM filter of claim 8, wherein the operating frequency is approximately 0.2 THz to 3 THz.

11. The tunable THz MTM filter of claim 9, wherein a permittivity of the liquid crystal layer exceeds 1 when a voltage is applied between the first control electrode and the second control electrode.

12. The tunable THz MTM filter of claim 9, wherein a permittivity of the liquid crystal layer is approximately 1 to 3 when a voltage is applied between the first control electrode and the second control electrode.

13. The tunable THz MTM filter of claim 9, wherein a permittivity of the liquid crystal layer is approximately 2 to 3 when a voltage is applied between the first control electrode and the second control electrode.

14. A tunable THz MTM filter comprising a plurality of the tunable THz MTM filters of claim 1 that are stacked on one another.

* * * * *